United States Patent
Rolfs et al.

(10) Patent No.: US 9,614,202 B2
(45) Date of Patent: Apr. 4, 2017

(54) BATTERY WELL FOR A MEDICAL TESTING DEVICE

(71) Applicant: Roche Diabetes Care, Inc., Indianapolis, IN (US)

(72) Inventors: Bryan Rolfs, Chicago, IL (US); Anthony J. Uberta, III, Indianapolis, IN (US)

(73) Assignee: Roche Diabetes Care, Inc., Indianapolis, IN (US)

( * ) Notice: Subject to any disclaimer, the term of this patent is extended or adjusted under 35 U.S.C. 154(b) by 155 days.

(21) Appl. No.: 14/068,172

(22) Filed: Oct. 31, 2013

(65) Prior Publication Data

US 2015/0118534 A1    Apr. 30, 2015

(51) Int. Cl.
  *H01M 2/10*    (2006.01)
(52) U.S. Cl.
  CPC ........ *H01M 2/1044* (2013.01); *H01M 2/1055* (2013.01); *H01M 2220/30* (2013.01)
(58) Field of Classification Search
  CPC .. H01M 2/10; H01M 2/1044; H01M 2220/30; H01M 2/1055
  See application file for complete search history.

(56) References Cited

U.S. PATENT DOCUMENTS

| | | | |
|---|---|---|---|
| 4,692,846 A | | 9/1987 | Johnson |
| 5,922,489 A | * | 7/1999 | Adachi ............... H01M 2/1044 429/100 |
| 6,042,962 A | * | 3/2000 | Ling ................... H01M 2/1044 429/100 |
| 6,119,864 A | * | 9/2000 | Kessler ................. B65D 83/04 206/703 |
| 6,124,056 A | * | 9/2000 | Kimura ............... H01M 2/1044 429/100 |
| 6,299,323 B1 | * | 10/2001 | Yu .......................... F21L 4/005 362/116 |
| 2006/0128208 A1 | * | 6/2006 | Huang ............... H01M 2/1044 439/500 |
| 2006/0263677 A1 | * | 11/2006 | Tsai ................... H01M 2/1038 429/97 |
| 2012/0087096 A1 | * | 4/2012 | Shen ................. G07C 9/00944 361/760 |

OTHER PUBLICATIONS

ACCU-CHEK® Aviva Blood Glucose Meter Owner's Manual (2008).
ACCU-CHEK® Aviva Nano Reference Manual (2011).

* cited by examiner

*Primary Examiner* — Miriam Stagg
*Assistant Examiner* — Brian Ohara
(74) *Attorney, Agent, or Firm* — Harness Dickey

(57) ABSTRACT

An electronic device may include a battery well and a plurality of tabs. The battery well may receive a disk-shaped battery and may include an annular sidewall, an open end, an end wall and a recess. The open end may be disposed at a first end of the sidewall. The end wall may be substantially perpendicular to the sidewall at a second end of the sidewall and axially between the recess and the open end. The recess may be disposed at the second end of the sidewall and adjacent the end wall. The recess may be adapted to receive a portion of the battery therein. The tabs may be disposed at the open end and may extend radially inward from the sidewall to releasably retain the battery in the battery well. The tabs may define a plane that is substantially parallel to the end wall.

18 Claims, 5 Drawing Sheets

BATTERY WELL FOR A MEDICAL TESTING DEVICE

FIELD

The present disclosure relates to a battery well for a medical testing device.

BACKGROUND

Electronic medical testing devices, such as blood-glucose testing devices, for example, may include one or more replaceable batteries for powering the device. It is desirable to configure such testing devices in a manner that allows for easy installation and removal of the batteries without tools and by users with limited dexterity.

This section provides background information related to the present disclosure and is not necessarily prior art.

SUMMARY

This section provides a general summary of the disclosure, and is not a comprehensive disclosure of its full scope or all of its features.

In one form, the present disclosure provides an electronic device may include a battery well and a plurality of tabs. The battery well may be configured to receive a disk-shaped battery and may include an annular sidewall, an open end, an end wall and a recess. The open end may be disposed at a first end of the annular sidewall. The end wall may be disposed substantially perpendicular to the annular sidewall at a second end of the annular sidewall and axially between the recess and the open end. The recess may be disposed at the second end of the annular sidewall and adjacent the end wall. The recess may be adapted to receive a portion of the battery therein. The plurality of tabs may be disposed at the open end and may extend radially inward from the annular sidewall to releasably retain the battery in the battery well. The plurality of tabs may cooperate to define a plane that is substantially parallel to the end wall.

The electronic device may be a blood-glucose meter or any other medical testing device, for example.

In some embodiments, the battery may be disposed between plurality of tabs and the end wall when the battery is fully installed in the battery well.

In some embodiments, the recess may be defined by a planar surface disposed at a first non-perpendicular and non-zero angle relative to the end wall and a second non-perpendicular and non-zero angle relative to a longitudinal axis of the battery well.

In some embodiments, the electronic device may include a button that is resiliently deflectable between first and second positions. The battery may be allowed to be received between the tabs and the end wall such that first and second opposite sides of the battery are substantially parallel to the end wall when the button is in the first position. Moving the button into the second position may cause the battery to disengage at least one of the tabs and be received into the recess such that the first and second sides of the battery are angled relative to the end wall.

In some embodiments, the button may include a cantilevered lever.

In some embodiments, the electronic device may include a first contact aligned with one of the plurality of tabs and a second contact protruding into the battery well though an opening in the end wall. The first and second contacts may contact the battery and cooperate with the battery to complete an electrical circuit when the battery is received in the battery well.

In some embodiments, the first and second contacts may include resiliently flexible springs that retain the battery in a fully installed position in the battery well.

In some embodiments, the first contact may contact a first side of the battery proximate a periphery of the battery.

In some embodiments, the second contact may contact a central region of a second side of the battery.

In another form, the present disclosure provides an electronic device that may include first and second battery wells and a depressible member. The first and second battery wells may be configured to receive first and second disk-shaped batteries, respectively. Each of the battery wells may include an annular sidewall, an open end, an end wall and a recess. The end wall may be disposed substantially perpendicular to the annular sidewall and axially between the recess and the open end. The recess may be disposed at an end of the annular sidewall and adjacent the end wall. The recess may be adapted to receive a portion of the respective one of the first and second batteries therein. The depressible member may be disposed between the first and second battery wells and may be resiliently movable toward and away from the recesses between a first position in which a surface of the depressible member is disposed at the open ends of the first and second battery wells and a second position in which the surface is disposed between the open ends and the recesses.

The electronic device may be a blood-glucose meter or any other medical testing device, for example.

In some embodiments, the electronic device may include first and second pluralities of tabs. The first plurality of tabs may be disposed at the open end of the first battery well and may extend radially inward from the annular sidewall of the first battery well to releasably retain the first battery in the first battery well. The second plurality of tabs may be disposed at the open end of the second battery well and may extend radially inward from the annular sidewall of the second battery well to releasably retain the second battery in the second battery well. The first and second pluralities of tabs may cooperate to define a plane that is substantially parallel to the end walls.

In some embodiments, the surface of the depressible member may be disposed along the plane in the first position and may be disposed between the plane and the recess in the second position.

In some embodiments, the batteries may be allowed to be received between the tabs and the end walls such that first and second opposite sides of the batteries are substantially parallel to the end walls when the depressible member is in the first position. Moving the depressible member into the second position may cause the first battery to disengage at least one of the first tabs and may cause the second battery to disengage at least one of the second tabs.

In some embodiments, moving the depressible member into the second position may cause the batteries to be received into respective recesses such that the first and second sides of the batteries are angled relative to the end walls.

In some embodiments, the recesses of the first and second wells may be defined by first and second planar surfaces, respectively, that are angled relative to the end wall and longitudinal axes of the first and second wells.

In some embodiments, the electronic device may include first, second, third and fourth contacts. The first contact may be aligned with one of the plurality of first tabs. The second contact may protrude into the first battery well though an opening in the end wall of the first battery well. The third contact may be aligned with one of the plurality of second tabs. The fourth contact may protrude into the second battery well though an opening in the end wall of the second battery well.

In some embodiments, the first and third contacts may contact first sides of the first and second batteries, respectively. The second and fourth contacts may contact second sides of the first and second batteries, respectively. In this manner, the first, second, third and fourth contacts may be configured to cooperate with the first and second batteries to complete an electrical circuit when the first and second batteries are received in the first and second battery wells, respectively.

In some embodiments, the first, second, third and fourth contacts may include resiliently flexible springs that retain the batteries in fully installed positions in the first and second battery wells.

In some embodiments, the first contact may contact the first battery proximate a periphery of the first battery.

In some embodiments, the second contact may contact a central region of the second side of the first battery.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
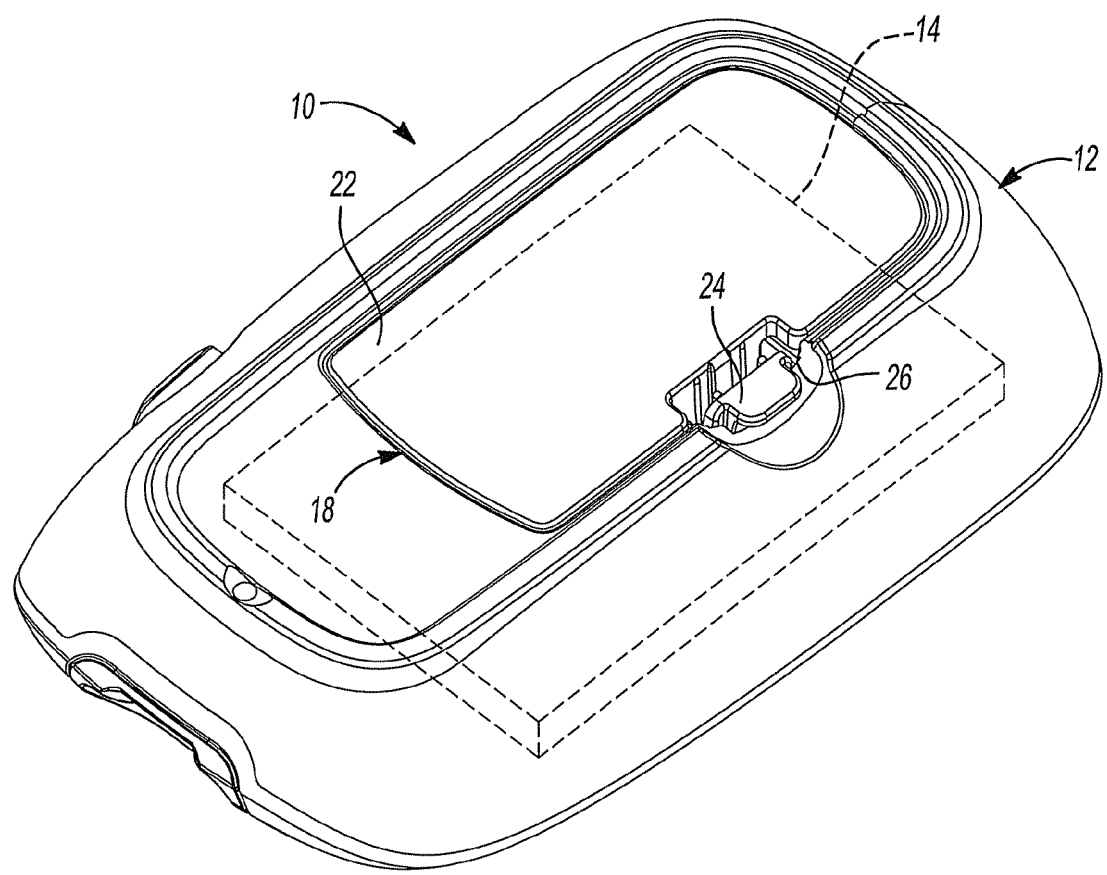
FIG. 1 is a perspective view of an electronic device including a battery door enclosing battery wells according to the principles of the present disclosure.

Example embodiments will now be described more fully with reference to the accompanying drawings.

With reference to FIGS. 1-4, an electronic device 10 is provided that may include a housing 12, a meter component 14 (shown schematically in FIG. 1), and one or more batteries 16. The meter component 14 may be disposed within the housing 12 and may be in communication with one or more user-interface buttons (not shown) and/or a display screen (not shown) of the electronic device 10. In some embodiments, the electronic device 10 may be a hand-held medical testing device such as a blood-glucose meter, for example. In such embodiments, the meter component 14 may be configured to measure a blood-glucose level from a blood sample (e.g., from a test strip). For example, the meter component 14 may be a blood-glucose measuring component of the type disclosed in assignee's commonly owned U.S. Pat. No. 8,394,343, the disclosure of which is hereby incorporated by reference. The batteries 16 may be electrically connected to the meter component 14 and the display screen and may provide electrical current thereto. It will be appreciated that the electronic device 10 could be any type of hand-held and/or portable electronic device.

The housing 12 may be molded or otherwise formed from a polymeric material, for example. The housing 12 may include a battery compartment 18 in which a pair of battery wells 20 may be formed. As will be described in more detail below, each battery well 20 may removably receive one of the batteries 16 therein. While the figures depict the battery compartment 18 having two battery wells 20 and two batteries 16, in some embodiments, the battery compartment 18 may include only a single battery well 20 and a single battery 16 or more than two battery wells 20 and more than two batteries 16. As shown in the FIG. 1, the battery compartment 18 may include a door 22 having a flexible tab 24 that snaps into engagement with a cavity 26 formed in the housing 12 to removably secure the door 22 to the housing 12. When engaged with the housing 12, the door 22 may cover and protect the battery wells 20 and batteries 16.

Figure 2:
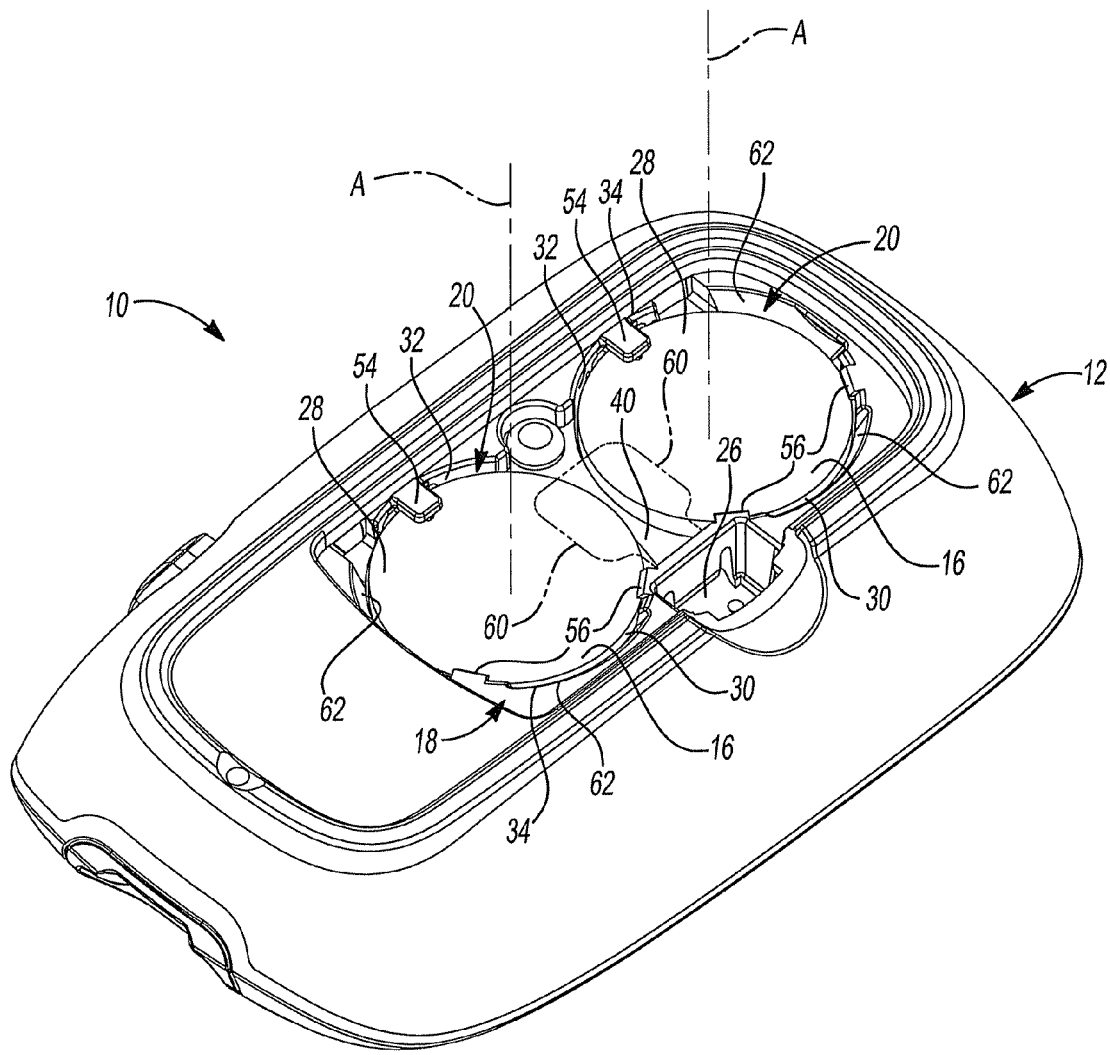
FIG. 2 is a perspective view of the electronic device of FIG. 1 with the battery door removed and batteries fully installed in the battery wells.
Figure 4:
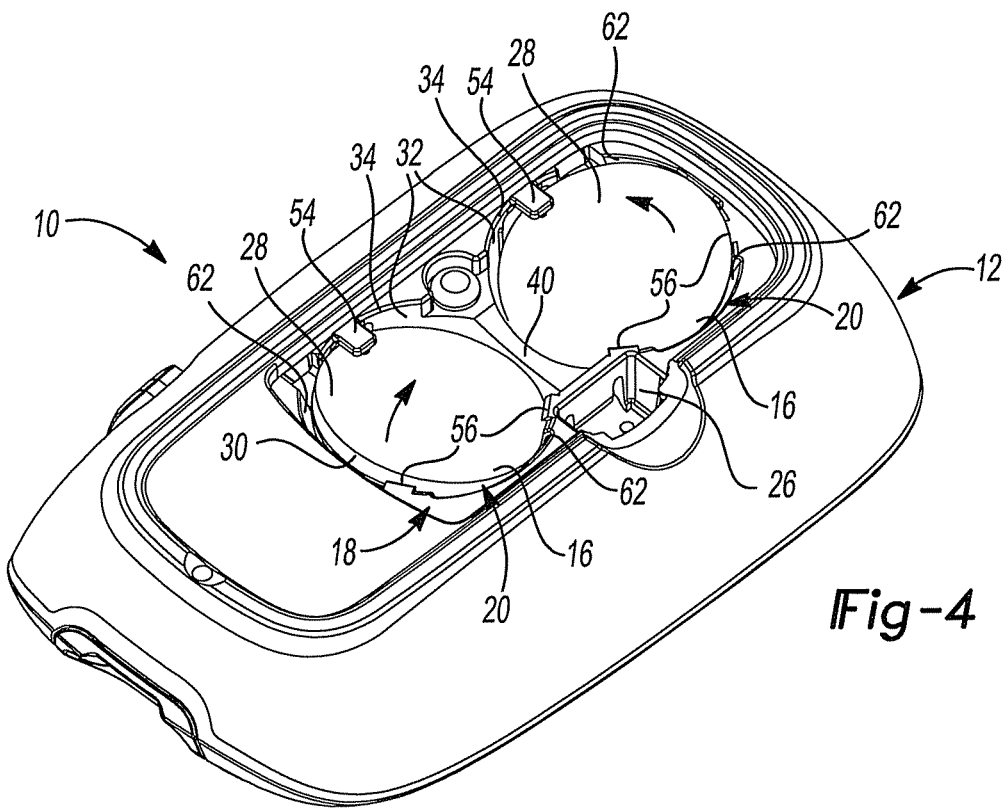
FIG. 4 is a perspective view of the electronic device with batteries in a partially disengaged position within the battery wells.

The batteries 16 may be disk-shaped batteries (e.g., button cells or coin cells). For example, in some embodiments, the batteries 16 may be three-volt lithium coin cell batteries (e.g., type CR 2032). It will be appreciated that the batteries 16 could be any type of generally disk-shaped batteries suitable for a given application. As shown in FIGS. 2 and 4, each of the batteries 16 may include a generally planar first side 28, a generally planar second side (not shown) that is substantially parallel to the first side 28 and an outer periphery 30 extending between the first side 28 and the second side. One of the first and second sides of each battery 16 may be negative terminal and the other of the first and second sides may be a positive terminal.

Figure 3:
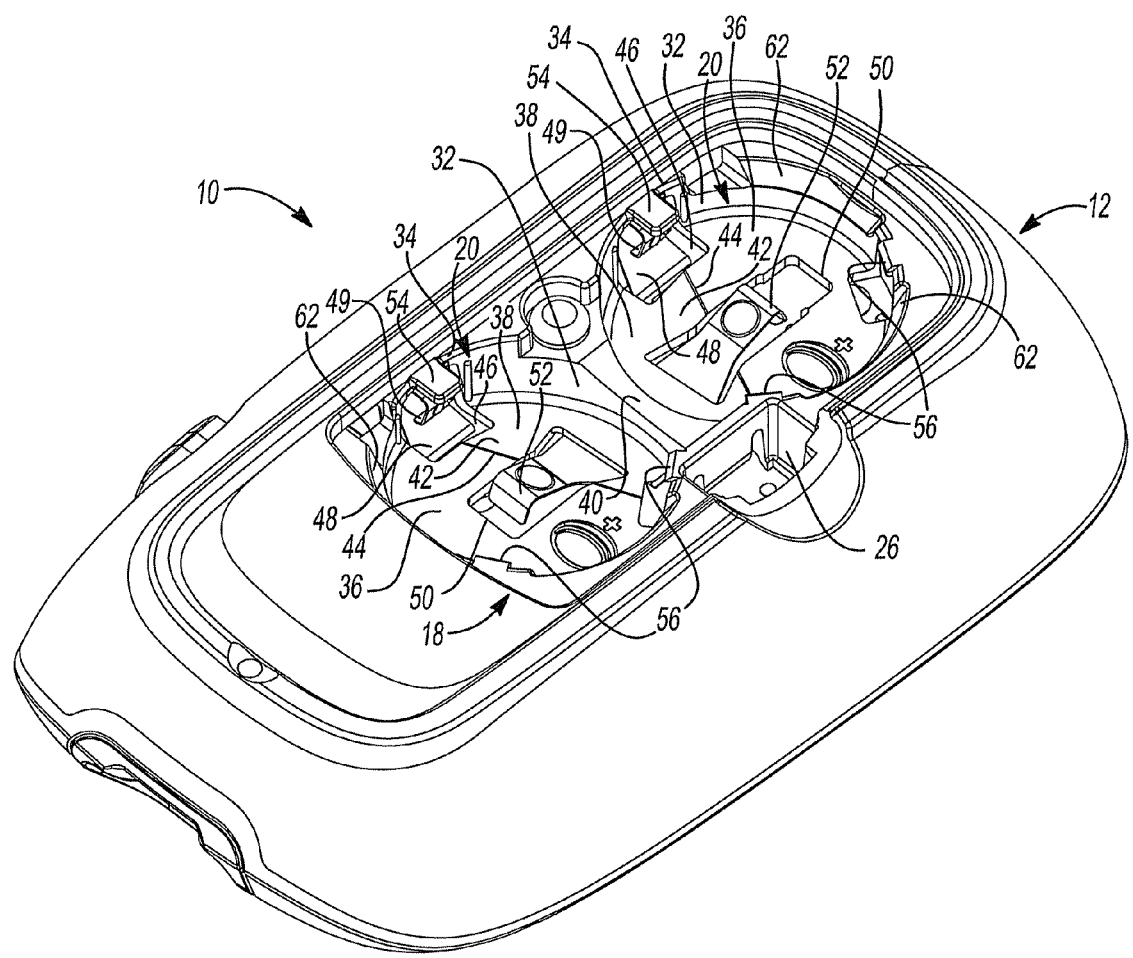
FIG. 3 is a perspective view of the electronic device with the batteries removed from the battery wells.

As shown in FIG. 3, each of the battery wells 20 may be a generally cylindrical cavity including an annular sidewall 32, an open end 34, an end wall 36 and a recess 38. The annular sidewall 32 may define an outer periphery of the battery well 20. Each annular sidewall 32 may be defined by a longitudinal axis A (i.e., an axis of rotational symmetry, as shown in FIG. 2). The annular sidewalls 32 of the adjacent battery wells 20 may be separated by a generally saddle-shaped or U-shaped wall 40.

The open end 34 may be disposed at one axial end of the annular sidewall 32, and the end wall 36 may be disposed at the opposite axial end of the annular sidewall 32. The end wall 36 may be a generally planar wall and may be substantially perpendicular to the longitudinal axis A. The recess 38 may be defined by a surface 42 (FIG. 3) that extends between the annular sidewall 32 and an edge 44 of the end wall 36. The surface 42 may be disposed at an angle relative to the end wall 36 and the longitudinal axis. The end wall 36 is disposed axially between the recess 38 and the open end 34. The recess 38 of each battery well 20 may be positioned so that the surface 42 slopes downward as it extends from a central region of the battery well to a region of the battery well 20 adjacent the wall 40 separating the two adjacent battery wells 20. In some embodiments, the edges 44 of the two adjacent battery wells 20 may be angled relative to each other, as shown in FIG. 3.

A first opening 46 (FIG. 3) may be formed in each battery well at or proximate the annular sidewall 32. A first terminal contact 48 may extend through each the first opening 46 of each battery well 20. Each battery well 20 may also include a second opening 50 (FIG. 3) formed in the end wall 36 and/or the surface 42 through which a second terminal contact 52 may extend into the battery well 20. The first terminal contact 48 may include a resiliently compressible distal end 49. The second terminal contact 52 may be a resiliently deflectable cantilever, for example. The first and second terminal contacts 48, 52 may be electrically connected to the meter component 14. The first terminal contact 48 may contact the first side 28 of the battery 16 and the second terminal contact 52 may contact the second side of the battery 16. In this manner, installation of the batteries 16 in the battery wells 20 may complete an electrical circuit including the batteries 16, the first and second terminal contacts 48, 52 and the meter component 14.

Each annular sidewall 32 may include a first tab 54 and a pair of second tabs 56 extending radially inward therefrom. The first and second tabs 54, 56 may be disposed at the open ends 34 of the battery wells 20 and may cooperate to define a plane that is substantially parallel to the end wall 36. Each first tab 54 may be angularly aligned with the first terminal contact 48 of the corresponding battery well 20. In this manner, the resiliently compressible distal end 49 of each first terminal contact 48 may be compressed between the first tab 54 and the first side 28 of the battery 16 when the battery 16 is installed in the battery well 20. The second tabs 56 may snap into engagement with the first side 28 of the battery 16 when the battery 16 is installed in the battery well 20. In this manner, the battery 16 may be retained in the battery well 20 between the end wall 36 and the tabs 54, 56. The spring forces of the deflected first and second contacts 48, 52 against the corresponding sides of the batteries 16 may help retain the batteries 16 within the battery wells 20 and maintain robust electrical connections between the battery 16 and the contacts 48, 52.

To install the batteries 16 in the corresponding battery wells 20, the outer periphery 30 of each battery 16 may be inserted into the battery well 20 between the end wall 36 and the first tab 54 so that the distal end 49 of the first contact 48 is compressed between the first side 28 of the battery 16 and the first tab 54. Thereafter, the remainder of the battery 16 may be pushed into the battery well 20 past the second tabs 56 so that battery 16 snaps into engagement with the second tabs 56. With the battery 16 fully received in the battery well 20, the first and second sides of the battery 16 may be substantially parallel to the end wall 36 and disposed entirely between the end wall 36 and the tabs 54, 56. It will be appreciated that the batteries 16 may be securely retained within the battery wells 20 even when the door 22 is not attached to the housing 12. Moreover, the electronic device 10 may be fully functional when the batteries 16 are fully installed in the battery wells 20 even when the door 22 is not attached to the housing 12.

To remove the batteries 16 from the battery wells 20, the user may press (e.g., with the his or her finger or thumb) on a region 60 (shown in FIG. 2 in phantom lines) of the first sides 28 of the batteries 16 adjacent the wall 40 and above the recess 38 so that the downward force exerted by the user causes the battery 16 pivot about the edge 44 and snap past one of the second tabs 56 so that the battery 16 can be partially received in the recess 38 (i.e., so that the first and second sides of the battery 16 may be substantially parallel with the surface 42 of the recess 38), as shown in FIG. 4. Thereafter, the spring force of the contacts 48, 52 may eject the battery 16 out of the battery well 20 or maintain the battery 16 in the tilted, partially disengaged position shown in FIG. 4 so that the user can easily grip the battery 16 and fully remove the battery 16 from the battery well 20. In the embodiment depicted in FIGS. 1-4, the user may press the region 60 of both batteries 16 simultaneously with a single finger or thumb to simultaneously disengage both batteries 16 from the tabs 56 so that the batteries 16 can be ejected or gripped and removed as described above.

In some embodiments, each annular sidewall 32 may include a pair of chamfered edges 62 at the open end 34 on either side of one of the second tabs 56 that is farther away from the recess 38 than the other one of the second tabs 56. The chamfered edges 62 provide clearance for the battery 16 to be tilted out of the battery well 20, as shown in FIG. 4.

Figure 5:
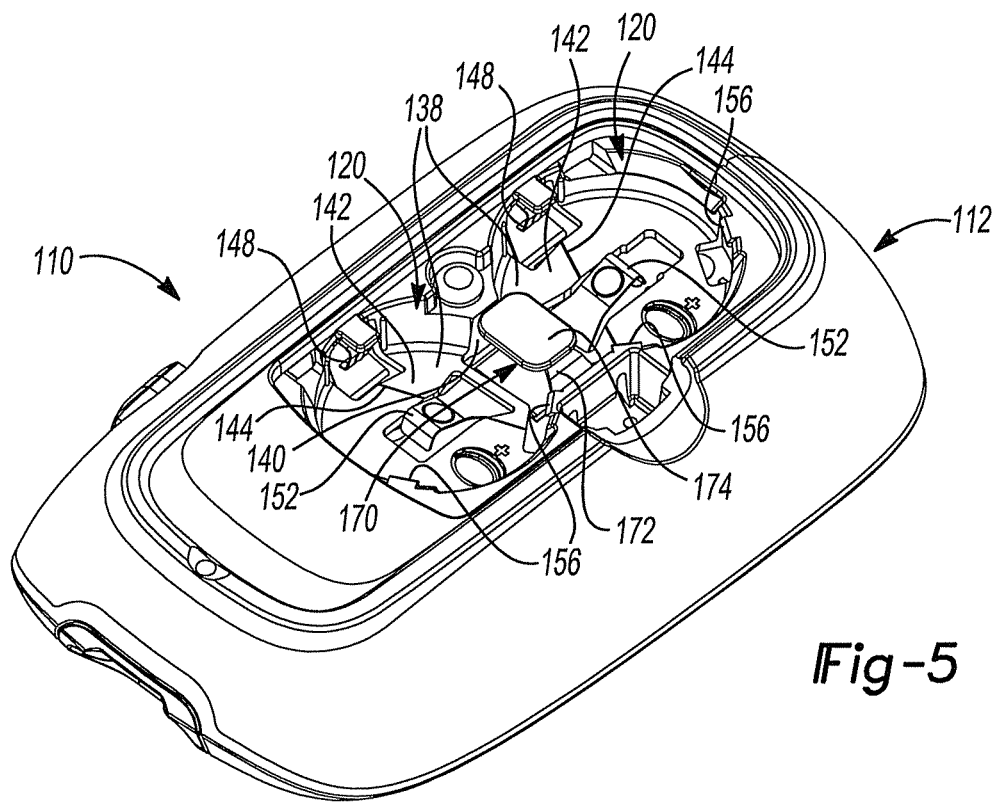
FIG. 5 is a perspective view of another electronic device including battery wells according to the principles of the present disclosure.
Figure 6:
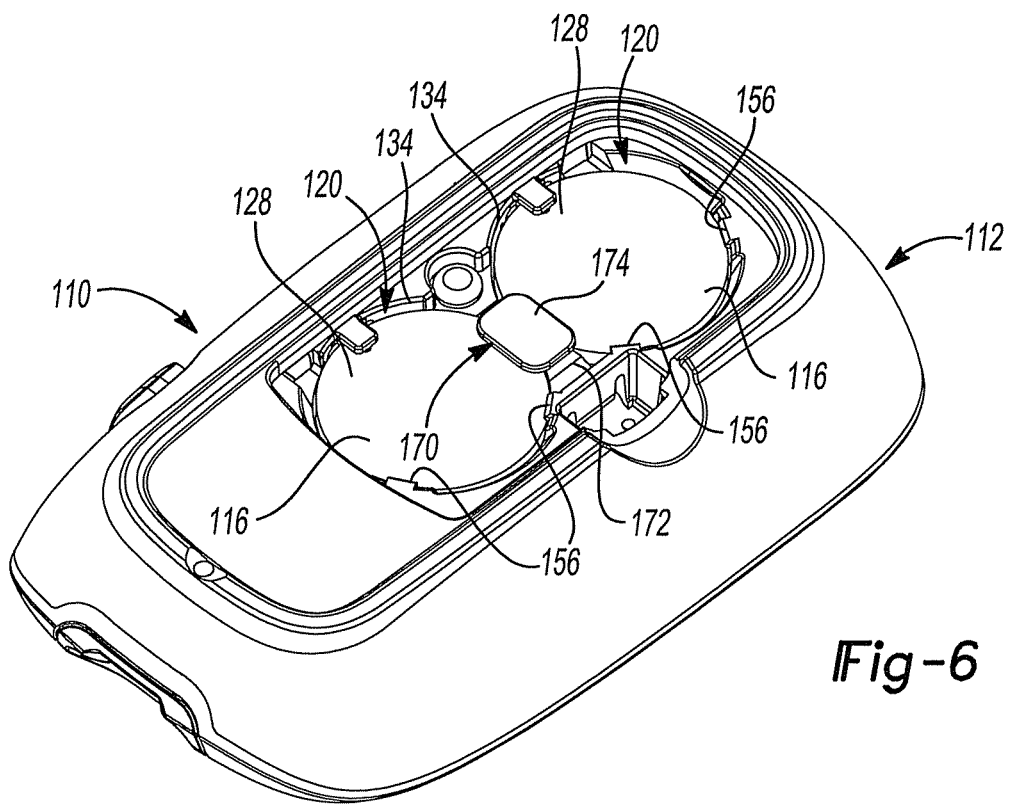
FIG. 6 is a perspective view of the electronic device of FIG. 5 with batteries fully installed in the battery wells.
Figure 7:
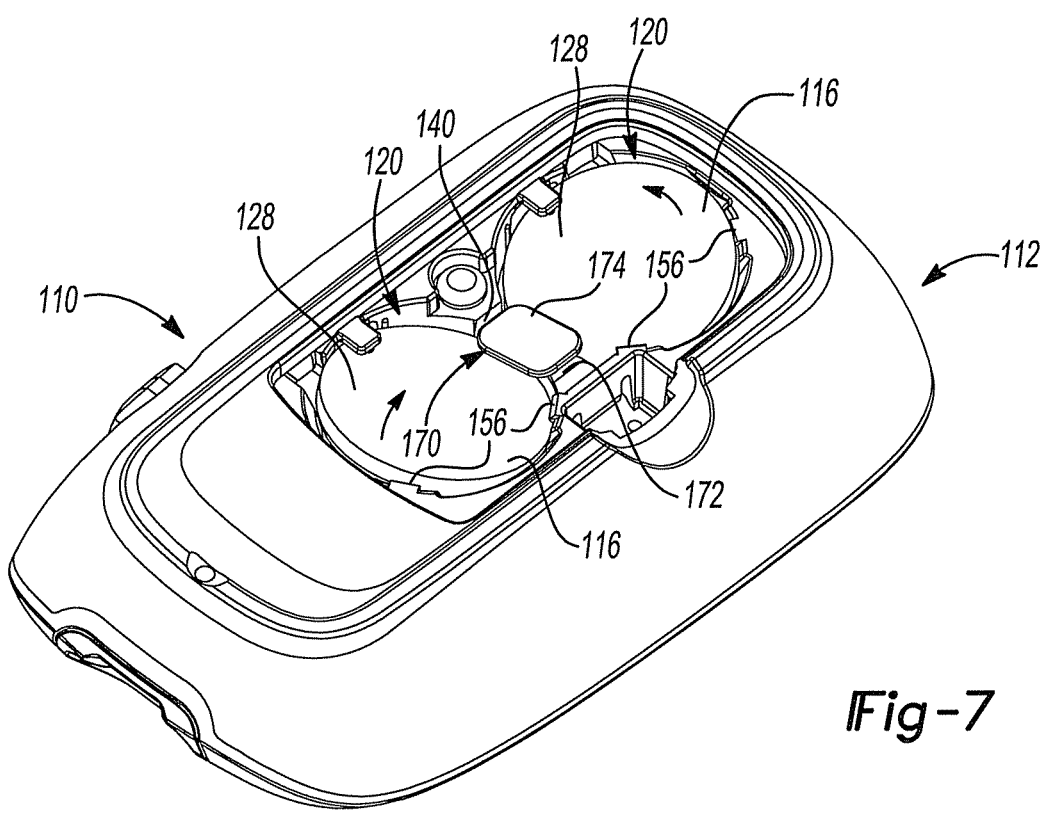
FIG. 7 is a perspective view of the electronic device of FIG. 5 with the batteries in a partially disengaged position within the battery wells.

With reference to FIGS. 5-7, another electronic device 110 is provided that may include a housing 112, a meter device (not shown), and one or more batteries 116. The structure and function of the housing 112, meter device and batteries 116 may be similar or identical to that of the housing 12, meter component 14 and batteries 16 described above, apart from any differences shown in the figures and/or described below. Therefore, similar features will not be described again in detail.

Like the housing 12, the housing 112 may include a pair of battery wells 120. The battery wells 120 may be similar or identical to the battery wells 20. Therefore, similar features will not be described again in detail. While the battery wells 20 are described above as being separated by the wall 40, the housing 112 may include an opening 140 in communication with both of the battery wells 120. The housing 112 may include a resiliently depressible button 170 that may be resiliently deflected into the opening 140 to force the batteries 116 into the tilted position shown in FIG. 4. In some embodiments, the button 170 may include a cantilevered lever 172 attached to the housing 112 at one end. A free end 174 of the button 170 may be disposed at or above open ends 134 of the battery wells 120 so that first sides 128 of the batteries 116 can be received in the battery wells 120 underneath the free end 174.

Installation of the batteries 116 into the battery wells 120 may be similar or identical to the process described above. To remove the batteries 116 from the battery wells 120, the user may press (e.g., with his or her finger or thumb) the free end 174 of the button 170 downward into the opening 140, thereby causing the free end 174 to exert a force on the batteries 116 that causes the batteries 116 to pivot into recess 138 about edge 144 (FIG. 5) and snap past one of a pair of second tabs 156 so that the batteries 116 can be partially received in the recess 138 (e.g., so that the first and second sides of the batteries 116 may be substantially parallel with surface 142 (FIG. 5) of the recess 138), as shown in FIG. 7. Thereafter, the spring force of contacts 148, 152 (FIG. 5) may eject the batteries 116 out of the battery wells 120 or maintain the batteries 116 in the tilted, partially disengaged position shown in FIG. 7 so that the user can easily grip the batteries 116 and fully remove the batteries 116 from the battery wells 120.

While the figures depict the electronic device 110 having two battery wells 120 and two batteries 116, in some embodiments, the electronic device 110 may include only a single battery well 120 and a single battery 116 or more than two battery wells 120 and more than two batteries 116.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electronic device comprising:
   first and second battery wells configured to receive first and second disk-shaped batteries, respectively, and each including an annular sidewall, an open end, an end wall and a recess, the end wall disposed substantially perpendicular to the annular sidewall and axially between the recess and the open end, the recess disposed at an end of the annular sidewall and adjacent the end wall, the recess adapted to receive a portion of the respective one of the first and second batteries therein; and
   a depressible member disposed between the first and second battery wells and resiliently movable toward and away from the recesses between a first position in which a surface of the depressible member is disposed at the open ends of the first and second battery wells and a second position in which the surface is disposed between the open ends and the recesses, the surface of the depressible member is disposed along a plane in the first position and is disposed between the plane and the recess in the second position,
   wherein the surface of the depressible member contacts the first and second batteries in the second position such that the surface transmits a force to the first and second batteries that moves the first and second batteries partially into the recesses and partially ejects the first and second batteries from the first and second battery wells.

2. The electronic device of claim 1, wherein the batteries are allowed to be received between the tabs and the end walls such that first and second opposite sides of the batteries are substantially parallel to the end walls when the depressible member is in the first position, and wherein moving the depressible member into the second position causes the first battery to disengage at least one of the first tabs and causes the second battery to disengage at least one of the second tabs.

3. The electronic device of claim 2, wherein moving the depressible member into the second position causes the batteries to be received into respective recesses such that the first and second sides of the batteries are angled relative to the end walls.

4. The electronic device of claim 1, wherein the recesses of the first and second wells are defined by first and second planar surfaces, respectively, that are angled relative to the end wall and longitudinal axes of the first and second wells, and wherein sides of the first and second batteries are substantially when the first and second batteries are in the fully installed position, and the sides of the first and second batteries are substantially parallel to the first and second planar surfaces, respectively, and angled relative to the end was when the first and second batteries are in the partially ejected position.

5. The electronic device of claim 1, further comprising:
a first contact aligned with one of the plurality of first tabs;
a second contact protruding into the first battery well though an opening in the end wall of the first battery well;
a third contact aligned with one of the plurality of second tabs; and
a fourth contact protruding into the second battery well though an opening in the end wall of the second battery well.

6. The electronic device of claim 5, wherein the first and third contacts contact first sides of the first and second batteries, respectively, and the second and fourth contacts contact second sides of the first and second batteries, respectively, such that the first, second, third and fourth contacts are configured to cooperate with the first and second batteries to complete an electrical circuit when the first and second batteries are received in the first and second battery wells, respectively.

7. The electronic device of claim 6, wherein the first, second, third and fourth contacts include resiliently flexible springs that retain the batteries in fully installed positions in the first and second battery wells.

8. The electronic device of claim 7, wherein the first contact contacts the first battery proximate a periphery of the first battery.

9. The electronic device of claim 8, wherein the second contact contacts a central region of the second side of the first battery.

10. An electronic device comprising:
first and second battery wells configured to receive first and second disk-shaped batteries, respectively, and each including an annular sidewall, an open end, an end wall and a recess, the end wall disposed substantially perpendicular to the annular sidewall and axially between the recess and the open end, the recess disposed at an end of the annular sidewall and adjacent the end wall, the recess adapted to receive a portion of the respective one of the first and second batteries therein; and
a depressible member disposed between the first and second battery wells and resiliently movable toward and away from the recesses between a first position in which a surface of the depressible member is disposed at the open ends of the first and second battery wells and a second position in which the surface is disposed between the open ends and the recesses,
a first plurality of tabs disposed at the open end of the first battery well and extending radially inward from the annular sidewall of the first battery well to releasably retain the first battery in the first battery well; and
a second plurality of tabs disposed at the open end of the second battery well and extending radially inward from the annular sidewall of the second battery well to releasably retain the second battery in the second battery well, the first and second pluralities of tabs cooperating to define a plane that is substantially parallel to the end walls,
wherein the surface of the depressible member contacts the first and second batteries in the second position such that the surface transmits a force to the first and second batteries that moves the first and second batteries partially into the recesses and partially ejects the first and second batteries from the first and second battery wells,
wherein the surface of the depressible member is disposed along the plane in the first position and is disposed between the plane and the recess in the second position.

11. The electronic device of claim 10, wherein the batteries are allowed to be received between the tabs and the end walls such that first and second opposite sides of the batteries are substantially parallel to the end walls when the depressible member is in the first position, and wherein moving the depressible member into the second position causes the first battery to disengage at least one of the first tabs and causes the second battery to disengage at least one of the second tabs.

12. The electronic device of claim 11, wherein moving the depressible member into the second position causes the batteries to be received into respective recesses such that the first and second sides of the batteries are angled relative to the end walls.

13. The electronic device of claim 10, wherein the recesses of the first and second wells are defined by first and second planar surfaces, respectively, that are angled relative to the end wall and longitudinal axes of the first and second wells, and wherein sides of the first and second batteries are substantially parallel to the end walls and angled relative to the first and second planar surfaces when the first and second batteries are in the fully installed position, and the sides of the first and second batteries are substantially parallel to the first and second planar surfaces, respectively, and angled relative to the end walls when the first and second batteries are in the partially ejected position.

14. The electronic device of claim 10, further comprising:
a first contact aligned with one of the plurality of first tabs;
a second contact protruding into the first battery well though an opening in the end wall of the first battery well;
a third contact aligned with one of the plurality of second tabs; and
a fourth contact protruding into the second battery well though an opening in the end wall of the second battery well.

15. The electronic device of claim 14, wherein the first and third contacts contact first sides of the first and second batteries, respectively, and the second and fourth contacts contact second sides of the first and second batteries, respectively, such that the first, second, third and fourth contacts are configured to cooperate with the first and second batteries to complete an electrical circuit when the first and second batteries are received in the first and second battery wells, respectively.

16. The electronic device of claim 15, wherein the first, second, third and fourth contacts include resiliently flexible springs that retain the batteries in fully installed positions in the first and second battery wells.

17. The electronic device of claim 16, wherein the first contact contacts the first battery proximate a periphery of the first battery.

18. The electronic device of claim 17, wherein the second contact contacts a central region of the second side of the first battery.

* * * * *

UNITED STATES PATENT AND TRADEMARK OFFICE
CERTIFICATE OF CORRECTION

PATENT NO. : 9,614,202 B2
APPLICATION NO. : 14/068172
DATED : April 4, 2017
INVENTOR(S) : Bryan Rolfs et al.

Page 1 of 1

It is certified that error appears in the above-identified patent and that said Letters Patent is hereby corrected as shown below:

<u>Column 8</u>
Line 62, Claim 4    after "substantially", insert --parallel to the end walls and angled related to the first and second planar surfaces--.
Line 66, Claim 4    "was" should be --walls--.

Signed and Sealed this
Twenty-fifth Day of July, 2017

Joseph Matal
*Performing the Functions and Duties of the
Under Secretary of Commerce for Intellectual Property and
Director of the United States Patent and Trademark Office*